(12) United States Patent
Rispens et al.

(10) Patent No.: US 11,520,410 B2
(45) Date of Patent: Dec. 6, 2022

(54) EVALUATING MOVEMENT OF A SUBJECT

(71) Applicant: KONINKLIJKE PHILIPS N.V., Eindhoven (NL)

(72) Inventors: Sietse Menno Rispens, Utrecht (NL); Warner Rudolph Theophile Ten Kate, Waalre (NL); Janneke Annegarn, Eindhoven (NL); Salvatore Saporito, Rotterdam (NL)

(73) Assignee: Koninklijke Philips N.V., Eindhoven (NL)

( * ) Notice: Subject to any disclaimer, the term of this patent is extended or adjusted under 35 U.S.C. 154(b) by 165 days.

(21) Appl. No.: 16/910,377

(22) Filed: Jun. 24, 2020

(65) Prior Publication Data

US 2020/0409467 A1 Dec. 31, 2020

(30) Foreign Application Priority Data

Jun. 25, 2019 (EP) .................................... 19182375

(51) Int. Cl.
*G08B 21/04* (2006.01)
*G06F 3/01* (2006.01)
(Continued)

(52) U.S. Cl.
CPC .............. *G06F 3/017* (2013.01); *G06F 3/011* (2013.01); *G06F 17/18* (2013.01); *G08B 21/043* (2013.01);
(Continued)

(58) Field of Classification Search
CPC .............. G08B 21/043; G08B 21/0446; G08B 21/0492; G08B 29/24; G06F 17/18
See application file for complete search history.

(56) References Cited

U.S. PATENT DOCUMENTS 8,206,325 B1 6/2012 Najafi
9,005,141 B1 * 4/2015 Najafi .................. A61B 5/7275
600/595

(Continued)

FOREIGN PATENT DOCUMENTS

CN 102657533 B 11/2013
WO 2013136251 A1 9/2013
(Continued)

*Primary Examiner* — John A Tweel, Jr.

(57) ABSTRACT

According to an aspect, there is provided a computer-implemented method for evaluating movement of a subject. The method comprises obtaining a first signal representing measurements of the subject from a first sensor; processing the first signal to determine a quality measure for the first signal; determining if the determined quality measure meets a first criterion; if the determined quality measure meets the first criterion, determining values for a plurality of features in a first feature set, the first feature set comprising one or more first features to be determined from the first signal, and evaluating the movement of the subject based on the values for the plurality of features in the first feature set; and, if the determined quality measure does not meet the first criterion, determining values for one or more features in a second feature set, wherein the one or more features in the second feature set are a subset of the plurality of features in the first feature set and the second feature set does not include at least one of the one or more first features in the first feature set, and evaluating the movement of the subject based on the values for the one or more features in the second feature set. A corresponding apparatus and computer program product are also provided.

15 Claims, 11 Drawing Sheets

(51) Int. Cl.
*G06F 17/18* (2006.01)
*G08B 29/24* (2006.01)

(52) U.S. Cl.
CPC ..... *G08B 21/0446* (2013.01); *G08B 21/0492* (2013.01); *G08B 29/24* (2013.01)

(56) References Cited

U.S. PATENT DOCUMENTS

| | | | |
|---|---|---|---|
| 9,587,941 B2* | 3/2017 | Ten Kate | G08B 21/0446 |
| 9,664,584 B2* | 5/2017 | Ten Kate | G01L 27/002 |
| 9,826,921 B2* | 11/2017 | Griffiths | A61B 5/7214 |
| 10,213,158 B2 | 2/2019 | Fyfe | |
| 10,408,914 B1* | 9/2019 | Wolfson | G01S 19/17 |
| 11,020,023 B2* | 6/2021 | Zhang | A61B 5/7246 |
| 11,100,781 B2* | 8/2021 | Pijl | A61B 5/112 |
| 2010/0052896 A1* | 3/2010 | Goodman | G01P 15/00 |
| | | | 340/584 |
| 2015/0313552 A1 | 11/2015 | Zhang | |
| 2016/0038061 A1 | 2/2016 | Kechichian | |
| 2016/0100776 A1 | 4/2016 | Najafi | |
| 2016/0370179 A1 | 12/2016 | Goetzke | |
| 2020/0046262 A1* | 2/2020 | Annegarn | A61B 5/1123 |

FOREIGN PATENT DOCUMENTS

| | | |
|---|---|---|
| WO | 2015113915 A1 | 8/2015 |
| WO | 2018069262 A1 | 4/2018 |
| WO | 2018127506 A1 | 7/2018 |

\* cited by examiner

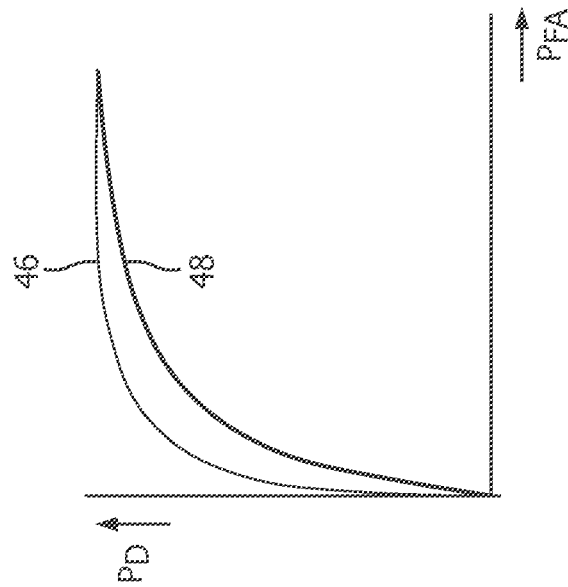
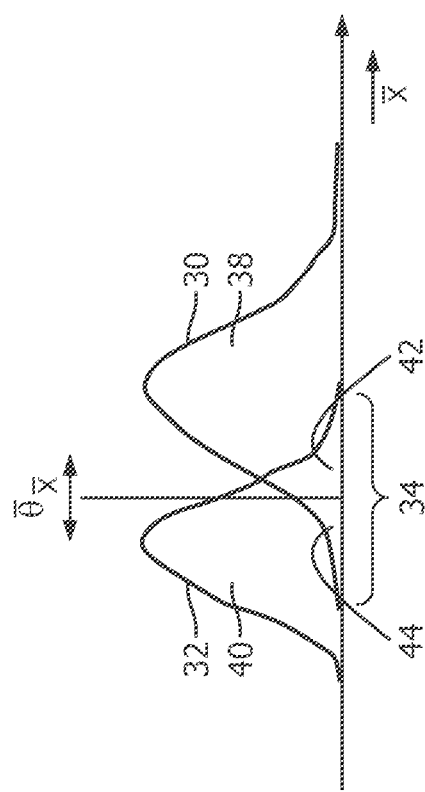
FIG. 6b
FIG. 6a

EVALUATING MOVEMENT OF A SUBJECT

CROSS REFERENCE TO PRIOR APPLICATIONS

This application claims the benefit of European Patent Application No. 19182375.6, filed Jun. 25, 2019 which is hereby incorporated by reference herein.

FIELD OF THE INVENTION

The invention relates to evaluating movement of a subject, and in particular to a computer-implemented method, apparatus and computer program product for evaluating movement of a subject.

BACKGROUND OF THE INVENTION

Falls are common among older adults. A fall is an event which typically results in a person impacting with and coming to rest on the ground or floor. In an estimated 20-30% of cases, falls lead to mild or severe injuries and may result in visits to an emergency department. A person lying on the ground or floor for a long time after a fall may be detrimental to the person, and therefore it is of importance to get help as fast as possible after a fall. Personal Emergency Response Systems (PERS) can enable people to signal for help by pressing a help button that is worn as a pendant around the neck or on the wrist. When the person presses their help button, they can be connected to a help provider (e.g. in a call centre) via an in-home communicator.

In addition to a help button, certain PERS devices can contain one or more sensors, such as an accelerometer and air pressure sensor, for enabling falls to be automatically detected. Algorithms that use the sensor signal(s) as input may be used to automatically trigger an alarm in case a fall is detected. This may result in help being obtained for the person more quickly, particularly if the person is not able to press the help button (e.g. the person is unconscious) or forgets to press the button. These algorithms typically determine values for one or more features from the sensor signals (e.g. an impact magnitude, a change in altitude, etc.) and determine whether a fall has occurred on the basis of those feature values.

In some cases the PERS functionality is provided by a dedicated device (e.g. that comprises the sensor(s) and capability to process the sensor signals), but in other cases the PERS functionality can be provided by a more general purpose electronic device that includes suitable sensors, such as a smartphone or smartwatch, and that runs a PERS software application.

In either case it is important for the reliable operation of the fall detection for the signals and measurements provided by the sensor(s) to be accurate and free (or relatively free) from artefacts. The accuracy of a sensor can depend on the quality of the sensor, and the quality of a sensor can vary between different types of electronic device (including dedicated PERS devices) that can provide PERS and/or fall detection capability. In addition, some sensors may require calibration before use, and/or require calibration from time to time, and a poor calibration or a calibration that drifts over time can affect the accuracy of the measurements from the sensor or features derived therefrom. In the case of a more general electronic device that includes suitable sensors, the provider of the PERS software application is not able to control the quality of the sensors in the device, and may not be able to adequately calibrate the sensors.

Similar considerations apply to other types of devices (or software applications) that generally evaluate the movement of a person, for example that detect footsteps of the person in order to detect when the person is walking, or that detect when a person has stood up from sitting on a chair (known as a sit-to-stand (STS) movement or STS transfer). Various measured characteristics of a person's movement (e.g. walking) can be used by clinicians to assess the mobility of the person, including assessing a person's risk of falling.

Therefore there is a need for techniques that provide for reliable evaluation of the movement of a person irrespective of artefacts or quality issues present in a measurement signal from a sensor that measures the movements of the person.

SUMMARY OF THE INVENTION

One example of sensor artefacts affecting the reliable evaluation of movement of a person is an acceleration signal from an accelerometer that can suffer from drift, i.e. the measurements can include an offset (also referred to as a DC offset), and so any features derived as part of a fall detection algorithm that are sensitive to drift or offset may become unreliable, thereby affecting the reliability of the fall detection outcome (i.e. fall or no fall). For example, a positive offset in the acceleration measurements could lead to an acceleration threshold for detecting an impact being exceeded (suggesting a fall) even though no impact has occurred. Other features that can be sensitive to drift or offset include peak power and peak acceleration during a sit-to-stand movement.

Another example is an air pressure sensor used to measure changes in altitude where the environmental air pressure changes or fluctuates due to weather conditions, such as storms or wind. In such situations the environmental air pressure can exhibit large fluctuations, which can be identified as changes in altitude of the person, which in turn may produce an unreliable result from the movement evaluation algorithm.

One approach to addressing this problem is to use a movement evaluation algorithm that does not extract features that are sensitive to the artefacts or quality issues, e.g. an algorithm that only extracts features from acceleration measurements that are not sensitive to offset or drift in the measurements. For example, a mobility or fall risk evaluation algorithm can use offset-robust features such as walking intensity, walking regularity and maximum jerk during a STS transfer. However, this is not ideal, as signal artefacts and quality issues may not be present all of the time (or even a majority of the time), and the features that are not used may have provided useful information for evaluating the movement and improved the reliability of the movement evaluation algorithm.

The techniques proposed herein provide an alternative approach in which one or more features that are sensitive to measurement signal quality issues are not used to evaluate the movement of the person when signal quality issues are present. In this way, the effect of signal quality issues on the reliability of the movement evaluation algorithm can be reduced. In some embodiments, the techniques proposed herein provide that the occurrence of a signal quality issue for a particular sensor can result in all of the features for that sensor being excluded from the movement evaluation algorithm. These techniques can be used both with dedicated devices for evaluating movement (e.g. a PERS device, a fall detector, a walking detector, etc.), and other devices that can be programmed or configured to evaluate movement (e.g. a smartphone or smartwatch).

According to a first specific aspect, there is provided a computer-implemented method for evaluating movement of a subject. The method comprises obtaining a first signal representing measurements of the subject from a first sensor; processing the first signal to determine a quality measure for the first signal; determining if the determined quality measure meets a first criterion; if the determined quality measure meets the first criterion, determining values for a plurality of features in a first feature set, the first feature set comprising one or more first features to be determined from the first signal, and evaluating the movement of the subject based on the values for the plurality of features in the first feature set; and, if the determined quality measure does not meet the first criterion, determining values for one or more features in a second feature set, wherein the one or more features in the second feature set are a subset of the plurality of features in the first feature set and the second feature set does not include at least one of the one or more first features in the first feature set, and evaluating the movement of the subject based on the values for the one or more features in the second feature set. This aspect has the advantage that the movement of the subject can be evaluated more reliably. In particular, when there are no (significant) artefacts or quality issues present in the first signal, the movement can be reliably evaluated using all of the features in the first feature set, and when there are artefacts or quality issues present in the first signal that affects the reliability of the value of at least one of the first features derived from the first signal, that feature or features in the first feature set are not used to evaluate the movement of the subject, thereby improving the reliability of the movement evaluation in the presence of artefacts or quality issues.

In some embodiments, the first feature set comprises a plurality of first features to be determined from the first signal.

In some embodiments the plurality of features in the first feature set can each be first features to be determined from the first signal. Thus, in these embodiments, in the presence of artefacts or quality issues, the number of first features that are determined from the first signal is reduced, but the first signal (and thus the first sensor) is still used in the movement evaluation.

In alternative embodiments, the first feature set further comprises one or more second features to be determined from a second signal representing measurements of the subject from a second sensor, the second feature set further comprises the one or more second features, the method further comprises obtaining the second signal from the second sensor; and the steps of determining values for one or more features in the first feature set and determining values for one or more features in the second feature set comprise determining values for the one or more second features from the second signal. In these embodiments, the second feature set may not include any of the one or more first features. These embodiments provide the advantage that in the event of artefacts or quality issues being present in the first signal, the first signal (and thus the first sensor) is not used to evaluate the movement of the subject, and instead the evaluation is based on measurements from a second sensor.

In some embodiments, the first sensor is an accelerometer and the first signal is an acceleration signal representing acceleration measurements. In these embodiments, the quality measure may be a measure of an offset in the acceleration signal. In these embodiments, the determined offset may meet the first criterion if the determined offset is below an offset threshold, and the determined offset may not meet the first criterion if the determined offset exceeds the offset threshold. In these embodiments, the first features may include one or more of: presence of an impact; change in altitude; velocity; vertical velocity; orientation of the subject and/or a part of the body of the subject; change in orientation of the subject and/or a part of the body of the subject; duration of the subject rising from a chair; peak acceleration of the subject rising from a chair; peak power of the subject rising from a chair; maximum jerk of the subject rising from a chair; and variance, period, periodicity, sample entropy and/or cadence of walking by the subject. In these embodiments, the second feature set may not include at least one of presence of an impact; change in altitude; velocity; vertical velocity; orientation of the subject and/or a part of the body of the subject; duration of the subject rising from a chair; peak acceleration of the subject rising from a chair; and peak power of the subject rising from a chair. Thus, features that are sensitive to (i.e. adversely affected by) offset in the acceleration signal are not part of the second feature set, which improves the reliability of the movement evaluation.

In alternative embodiments, the first sensor is an air pressure sensor and the first signal is an air pressure signal representing air pressure measurements. In these embodiments, the quality measure can be a measure of variance in the air pressure signal or a measure of variance in differences in the air pressure signal. In these embodiments, the determined variance may meet the first criterion if the determined variance is below a variance threshold, and the determined variance may not meet the first criterion if the determined variance exceeds the variance threshold. In these embodiments, the first features may include one or more of: altitude, change in altitude of the subject; vertical velocity; and vertical acceleration. In these embodiments, the second feature set may not include at least altitude. Thus, as altitude measurements are sensitive to (i.e. adversely affected by) variance (noise) in the air pressure signal, altitude is not part of the second feature set, which improves the reliability of the movement evaluation.

In some embodiments, the step of evaluating movement of the subject determines one or more of: whether the subject has fallen, a fall risk for the subject, a mobility level of the subject and the physical activity or activities performed by the subject.

According to a second aspect, there is provided a computer readable medium having computer readable code embodied therein, the computer readable code being configured such that, on execution by a suitable computer or processor, the computer or processor is caused to perform the method according to the first aspect of any embodiment thereof.

According to a third aspect, there is provided an apparatus for evaluating movement of a subject. The apparatus comprises a processing unit that is configured to: obtain a first signal representing measurements of the subject; process the first signal to determine a quality measure for the first signal; determine if the determined quality measure meets a first criterion; determine values for a plurality of features in a first feature set if the determined quality measure meets the first criterion, the first feature set comprising one or more first features to be determined from the first signal, and evaluate the movement of the subject based on the values for the plurality of features in the first feature set; and determine values for one or more features in a second feature set if the determined quality measure does not meet the first criterion, wherein the one or more features in the second feature set are a subset of the plurality of features in the first feature set and the second feature set does not include at least one of the one or more first features in the first feature set, and evaluate the movement of the subject based on the values for the one or more features in the second feature set. This aspect has the advantage that the movement of the subject can be evaluated more reliably. In particular, when there are no (significant) artefacts or quality issues present in the first signal, the movement can be reliably evaluated using all of the features in the first feature set, and when there are artefacts or quality issues present in the first signal that affects the reliability of the value of at least one of the first features derived from the first signal, that feature or features in the first feature set are not used to evaluate the movement of the subject, thereby improving the reliability of the movement evaluation in the presence of artefacts or quality issues.

In some embodiments, the first feature set comprises a plurality of first features to be determined from the first signal.

In some embodiments, the plurality of features in the first feature set can each be first features to be determined from the first signal. Thus, in these embodiments, in the presence of artefacts or quality issues, the number of first features that are determined from the first signal is reduced, but the first signal (and thus the first sensor) is still used in the movement evaluation.

In alternative embodiments, the first feature set further comprises one or more second features to be determined from a second signal representing measurements of the subject from a second sensor, the second feature set further comprises the one or more second features, the processing unit is further configured to obtain the second signal from the second sensor; and the processing unit is configured to determine values for one or more features in the first feature set and determine values for one or more features in the second feature set by determining values for the one or more second features from the second signal. In these embodiments, the second feature set may not include any of the one or more first features. These embodiments provide the advantage that in the event of artefacts or quality issues being present in the first signal, the first signal (and thus the first sensor) is not used to evaluate the movement of the subject, and instead the evaluation is based on measurements from a second sensor.

In some embodiments, the first sensor is an accelerometer and the first signal is an acceleration signal representing acceleration measurements. In these embodiments, the quality measure may be a measure of an offset in the acceleration signal. In these embodiments, the determined offset may meet the first criterion if the determined offset is below an offset threshold, and the determined offset may not meet the first criterion if the determined offset exceeds the offset threshold. In these embodiments, the first features may include one or more of: presence of an impact; change in altitude; velocity; vertical velocity; orientation of the subject and/or a part of the body of the subject; change in orientation of the subject and/or a part of the body of the subject; duration of the subject rising from a chair; peak acceleration of the subject rising from a chair; peak power of the subject rising from a chair; maximum jerk of the subject rising from a chair; and variance, period, periodicity, sample entropy and/or cadence of walking by the subject. In these embodiments, the second feature set may not include at least one of presence of an impact; change in altitude; velocity; vertical velocity; orientation of the subject and/or a part of the body of the subject; duration of the subject rising from a chair; peak acceleration of the subject rising from a chair; and peak power of the subject rising from a chair. Thus, features that are sensitive to (i.e. adversely affected by) offset in the acceleration signal are not part of the second feature set, which improves the reliability of the movement evaluation.

In alternative embodiments, the first sensor is an air pressure sensor and the first signal is an air pressure signal representing air pressure measurements. In these embodiments, the quality measure can be a measure of variance in the air pressure signal or a measure of variance in differences in the air pressure signal. In these embodiments, the determined variance may meet the first criterion if the determined variance is below a variance threshold, and the determined variance may not meet the first criterion if the determined variance exceeds the variance threshold. In these embodiments, the first features may include one or more of: altitude, change in altitude of the subject; vertical velocity; and vertical acceleration. In these embodiments, the second feature set may not include at least altitude. Thus, as altitude measurements are sensitive to (i.e. adversely affected by) variance (noise) in the air pressure signal, altitude is not part of the second feature set, which improves the reliability of the movement evaluation.

In some embodiments, the processing unit is configured to evaluate movement of the subject by determining one or more of: whether the subject has fallen, a fall risk for the subject, a mobility level of the subject and the physical activity or activities performed by the subject.

According to a fourth aspect, there is provided a system for evaluating movement of a subject. The system comprises a device that is to be worn or carried by a subject and that comprises a first sensor for measuring the subject to generate the first signal; and an apparatus according to the third aspect or any embodiment thereof.

In some embodiments, the apparatus is part of the device. In alternative embodiments, the apparatus is separate from the device.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which:

FIG. 6(a) is a graph illustrating respective probability distributions of feature values occurring for a non-fall and a fall, and FIG. 6(b) is a graph illustrating receiver operating characteristics, ROC, curves.

DETAILED DESCRIPTION OF EMBODIMENTS

As noted above, it is desirable to provide improvements in the processing of sensor measurements to evaluate the movements of a person (referred to hereafter as a 'subject'), for example evaluating the walking ability of the subject, evaluating whether the subject has suffered a fall, evaluating a sit-to-stand movement, or determining the physical activity of the subject (i.e. determine what activity the subject is doing, such as sitting down, standing up, walking, running, ascending stairs, descending stairs, falling, lying down, exercising, etc.) that are more robust to changes in the quality of the sensor measurements or sensor signal.

Figure 1:
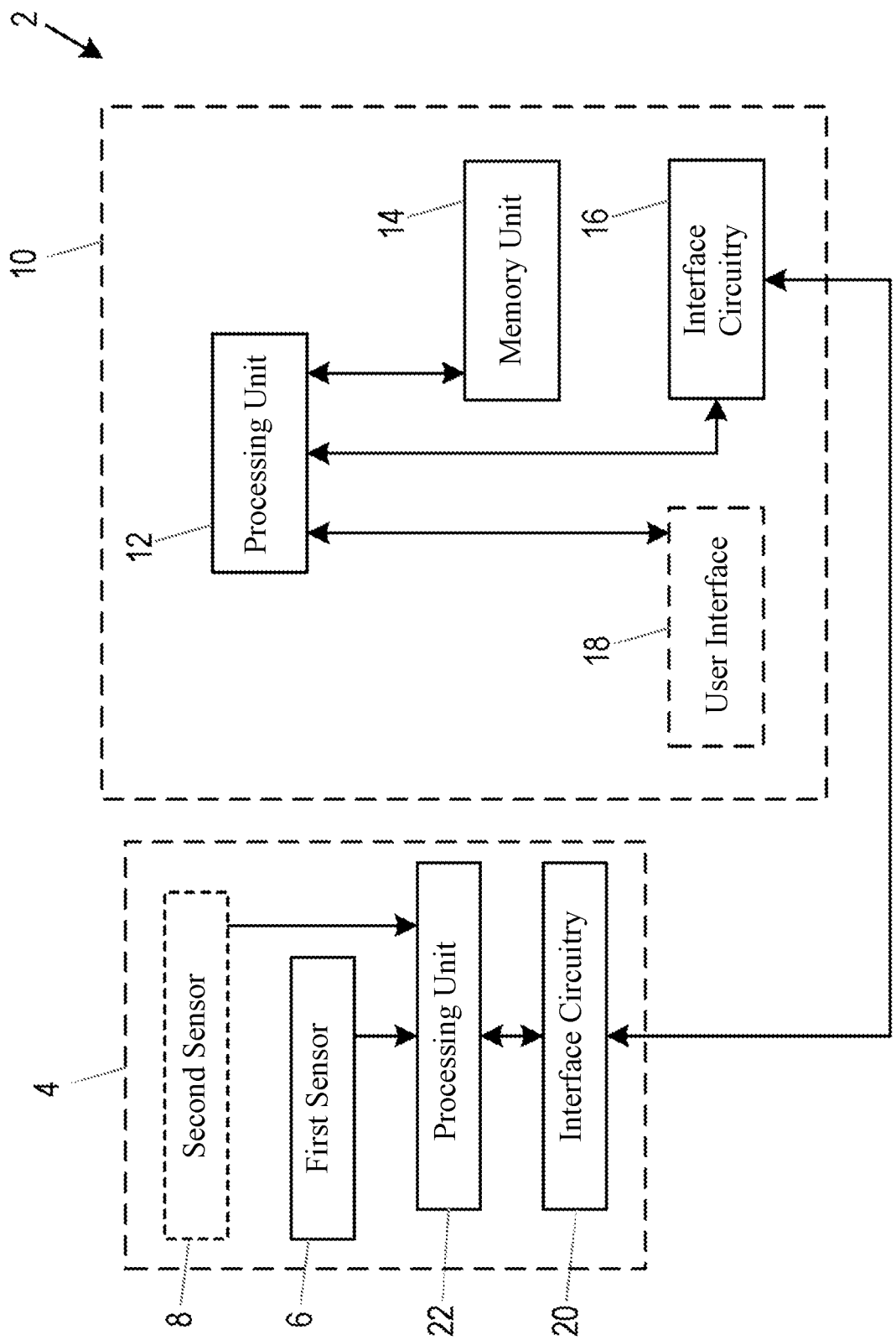
FIG. 1 is a block diagram illustrating a system comprising an apparatus and device according to an exemplary embodiment.

FIG. 1 illustrates a system 2 according to an exemplary embodiment of the teachings presented herein. In this embodiment the system 2 comprises a device 4 that is carried or worn by the subject and that includes a first sensor 6 for measuring some aspect of the subject over time. In some embodiments, the device 4 can include a second sensor 8 that is a different type of sensor to the first sensor 6 that also measures some aspect of the subject over time. In further embodiments, the device 4 can include further sensors in addition to the first sensor 6 and second sensor 8.

Each sensor 6, 8 generates and outputs a respective signal representing measurements of the respective aspect of the subject over time. Each measurement signal can comprise a time series of measurements (samples), and the measurement signal can therefore relate to the measurements in a time period. Each sensor 6, 8 can use any desired sampling frequency, for example 50 measurements per second (50 Hz), 64 Hz or 100 Hz. Different sensors may run at different sampling rates. For example, another sensor may be sampled at 2 Hz, or 4 Hz, or 0.4 Hz, or 1 Hz.

As the system 2 is to evaluate the movement of the subject, typically at least one sensor 6, 8 in the system is a sensor that directly or indirectly measures the movements of the subject over time. For example, the sensors 6, 8 can be any of an accelerometer, an air pressure sensor, a magnetometer, a gyroscope, a satellite positioning system (SPS) receiver (e.g. a GPS receiver, a GLONASS receiver, a Galileo positioning system receiver, etc.), and a pressure sensor that can be positioned in the subject's shoe (or in each shoe) or other footwear to measure the pressure that the foot is applying to the ground (since these measurements can be indicative of footsteps). A sensor that directly or indirectly measures the movements of the subject over time is referred to herein as a "movement sensor", and the movement sensor outputs a "movement signal" representing "movement measurements".

Although the system 2 typically includes at least one movement sensor, it will be appreciated that movement of the subject can also be evaluated using measurements from one or more sensors that do not directly or indirectly measure movement of the subject, and such sensors can be provided in addition to, or alternatively to, one or more movement sensors. For example, a skin conductivity sensor can be used to provide measurements of skin conductivity that can be evaluated by a fall detection algorithm to determine if the subject is experiencing a stress response (for example which could be expected following a fall). Similarly, a photoplethysmography (PPG) sensor can be used to provide measurements of blood volume over time at the PPG sensor location on the body, with the PPG signal representing a subject's pulse or heartbeat. The PPG signal can also be evaluated by a fall detection algorithm to determine if the subject is experiencing a stress response, or by a walking detection or assessment algorithm to determine if the subject is physically exerting themselves or is generally inactive (e.g. sedentary). Those skilled in the art will be aware of other types of physiological characteristic sensors that can be used in evaluating the movement of a subject according to the techniques described herein.

Several embodiments of the system 2 are envisaged having particular combinations of sensor types. In a first series of embodiments, the system 2 comprises a single sensor (the first sensor 6), and the first sensor 6 is an accelerometer. In a second series of embodiments, the first sensor 6 is an accelerometer, and the second sensor 8 is an air pressure sensor or a gyroscope. In a third series of embodiments, the first sensor 6 is an accelerometer, the second sensor 8 is one of an air pressure sensor and a gyroscope, and the system 2 further comprises a third sensor that is the other one of the air pressure sensor and gyroscope. In a fourth series of embodiments, the first sensor 6 is an air pressure sensor, and the second sensor 8 is one of an accelerometer or a gyroscope. In a fifth series of embodiments, the first sensor 6 is an air pressure sensor, the second sensor 8 is one of an accelerometer and a gyroscope, and the system 2 further comprises a third sensor that is the other one of the accelerometer and gyroscope. In any of these embodiments, the system 2 could further comprise a sensor such as a skin conductivity sensor and/or a PPG sensor.

In the case of an accelerometer, the accelerometer can generate and output a movement signal that contains a plurality of acceleration measurement samples representing the movements of the subject at a plurality of time instants. The accelerometer is typically an accelerometer that measures accelerations in three dimensions, and the movement signal generated by the accelerometer can include respective measurements representing the accelerations in each of the three dimensions. For example, the accelerometer can output respective measurement signals for each of an x-axis, y-axis and z-axis of a Cartesian coordinate system.

In the case of an air pressure sensor, the air pressure sensor can include any type of sensor for measuring air pressure or changes in air pressure. The air pressure sensor can generate and output an air pressure signal representing measurements of air pressure or changes in air pressure at the air pressure sensor. The air pressure signal can comprise a time series of air pressure measurements (samples) and the air pressure signal can therefore relate to the air pressure or changes in air pressure in a time period. The air pressure sensor can use any desired sampling frequency, for example 1 Hz or 50 Hz. In other embodiments a microphone might be used. Typically, the microphone is sampled at 16 kHz or higher frequencies.

Returning to FIG. 1, the system 2 also comprises an apparatus 10 that receives the sensor measurements or sensor signals from the sensor(s) 6, 8 in the device 4 and analyses the measurements or signals to evaluate the movement of the subject, e.g. to detect a fall, to determine a fall risk, or evaluate a walking ability and quality of the subject.

The device 4 can be in any form suitable enabling the subject to carry or wear the device 4. For example, the device 4 may be in the form of a watch or smartwatch, a smartphone, a bracelet, a pendant, a necklace, a chest band, integrated into an item of clothing, etc. In some embodiments, as shown in FIG. 1, the apparatus 10 can be separate from the device 4. In these embodiments, the apparatus 10 can be any type of electronic device or computing device that can communicate with, or otherwise receive the measurements or sensor signal(s) directly or indirectly from, the device 4. For example the apparatus 10 can be, or be part of, a computer, a laptop, a tablet, a smartphone, a smartwatch, etc., and as such may be an apparatus that is present or used in the home or care environment of the subject. In other implementations, the apparatus 10 can be an apparatus that is remote from the subject, and remote from the home or care environment of the subject. For example, the apparatus 10 can be a server, for example a server in a data centre (also referred to as being 'in the cloud'). In alternative embodiments, the apparatus 10 (and in particular the functionality of the apparatus 10 as described herein) can be integral with the device 4. Therefore the apparatus 10 can also be carried or worn by the subject as part of the device 4.

The apparatus 10 includes a processing unit 12 that controls the operation of the apparatus 10 and that can be configured to execute or perform the methods described herein. In particular, the processing unit 12 can obtain the measurements/signal(s) and process them to evaluate the movement of the subject. The processing unit 12 can be implemented in numerous ways, with software and/or hardware, to perform the various functions described herein. The processing unit 12 may comprise one or more microprocessors or digital signal processor (DSPs) that may be programmed using software or computer program code to perform the required functions and/or to control components of the processing unit 12 to effect the required functions. The processing unit 12 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The processing unit 12 is connected to a memory unit 14 that can store data, information and/or signals (including movement measurements and/or air pressure measurements) for use by the processing unit 12 in controlling the operation of the apparatus 10 and/or in executing or performing the methods described herein. In some implementations the memory unit 14 stores computer-readable code that can be executed by the processing unit 12 so that the processing unit 12 performs one or more functions, including the methods described herein. In particular embodiments, the program code can be in the form of an application for a smartwatch, a smartphone, tablet, laptop or computer. The memory unit 14 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM) and electrically erasable PROM (EEPROM), implemented in the form of a memory chip, an optical disk (such as a compact disc (CD), a digital versatile disc (DVD) or a Blu-Ray disc), a hard disk, a tape storage solution, or a solid state device, including a memory stick, a solid state drive (SSD), a memory card, etc.

In the embodiment of the system 2 shown in FIG. 1, as the apparatus 10 is separate from the device 4 that includes the first sensor 6 and (optional) second sensor 8, the apparatus 10 also includes interface circuitry 16 for enabling a data connection to and/or data exchange with other devices, including device 4, and optionally any one or more of servers, databases, user devices, and other sensors. The connection may be direct or indirect (e.g. via the Internet), and thus the interface circuitry 16 can enable a connection between the apparatus 10 and a network, such as the Internet, or between the apparatus 10 and device 4, via any desirable wired or wireless communication protocol. For example, the interface circuitry 16 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.). In the case of a wireless connection, the interface circuitry 16 (and thus apparatus 10) may include one or more suitable antennas for transmitting/receiving over a transmission medium (e.g. the air). Alternatively, in the case of a wireless connection, the interface circuitry 16 may include means (e.g. a connector or plug) to enable the interface circuitry 16 to be connected to one or more suitable antennas external to the apparatus 10 for transmitting/receiving over a transmission medium (e.g. the air). The interface circuitry 16 is connected to the processing unit 12 to enable information or data received by the interface circuitry 16 to be provided to the processing unit 12, and/or information or data from the processing unit 12 to be transmitted by the interface circuitry 16.

The interface circuitry 16 can be used to receive measurements/signal generated by the first sensor 6 and measurements/signal generated by the second sensor 8, and any further sensor(s) (if present in the system 2).

In some embodiments, the interface circuitry 16 can be used to output a result of the processing by the processing unit 12, for example an indication of the evaluation of the movement of the subject (e.g. an indication that the subject has suffered a fall).

In some embodiments, the apparatus 10 comprises a user interface 18 that includes one or more components that enables a user of apparatus 10 (e.g. the subject, or a care provider for the subject) to input information, data and/or commands into the apparatus 10 (e.g. for starting or enabling the evaluation of movement according to the techniques described herein), and/or enables the apparatus 10 to output information or data to the user of the apparatus 10. An output may be an audible, visible and/or tactile indication that the subject has traversed stairs, for example. The user interface 18 can comprise any suitable input component(s), including but not limited to a keyboard, keypad, one or more buttons, switches or dials, a mouse, a track pad, a touchscreen, a stylus, a camera, a microphone, etc., and the user interface 18 can comprise any suitable output component(s), including but not limited to a display screen, one or more lights or light elements, one or more loudspeakers, a vibrating element, etc.

It will be appreciated that a practical implementation of apparatus 10 may include additional components to those shown in FIG. 1. For example the apparatus 10 may also include a power supply, such as a battery, or components for enabling the apparatus 10 to be connected to a mains power supply.

As noted above, the first sensor 6 and second sensor 8 (if present) are part of device 4, which is separate from the apparatus 10 in the embodiment shown in FIG. 1. In order for the measurements/signal(s) to be communicated from the device 4 to the apparatus 10, the device 4 comprises interface circuitry 20. The interface circuitry 20 may be implemented in a similar way to the interface circuitry 16 in the apparatus 10.

In some embodiments, the device 4 can also include a processing unit 22 for controlling the operation of the device 4. This processing unit 22 can also be used to perform some pre-processing of the measurements/signal(s) before they are communicated to the apparatus 10, for example the measurements can be filtered to reduce or remove a noise component or artefacts. The processing unit 22 may be implemented in a similar way to the processing unit 12 in the apparatus 10.

It will be appreciated that a practical implementation of device 4 may include additional components to those shown in FIG. 1. For example the device 4 may also include a power supply, preferably a battery so that the device 4 is portable, or components for enabling the device 4 to be connected to a mains power supply.

In alternative embodiments of the system 2 where the apparatus 10 is part of the device 4, it will be appreciated that only one processing unit 12/22 may be present, and interface circuitry is not required to communicate the measurements/signal(s) to the processing unit 12.

As noted above, movement of a subject can be evaluated by an algorithm that determines a number of features from measurements of the subject (e.g. measurements of movement, measurements of other characteristics such as skin conductivity, heart rate, etc.). Some of these features may be sensitive to artefacts in the measurements or measurement signal(s), meaning that the feature values may be influenced or affected by these artefacts. In that case, the reliability of the algorithm may decrease if artefacts are present. These artefacts may be due to the quality of the sensor, or due to poor calibration of the sensor, or the calibration of the sensor drifting over time.

Figure 2:
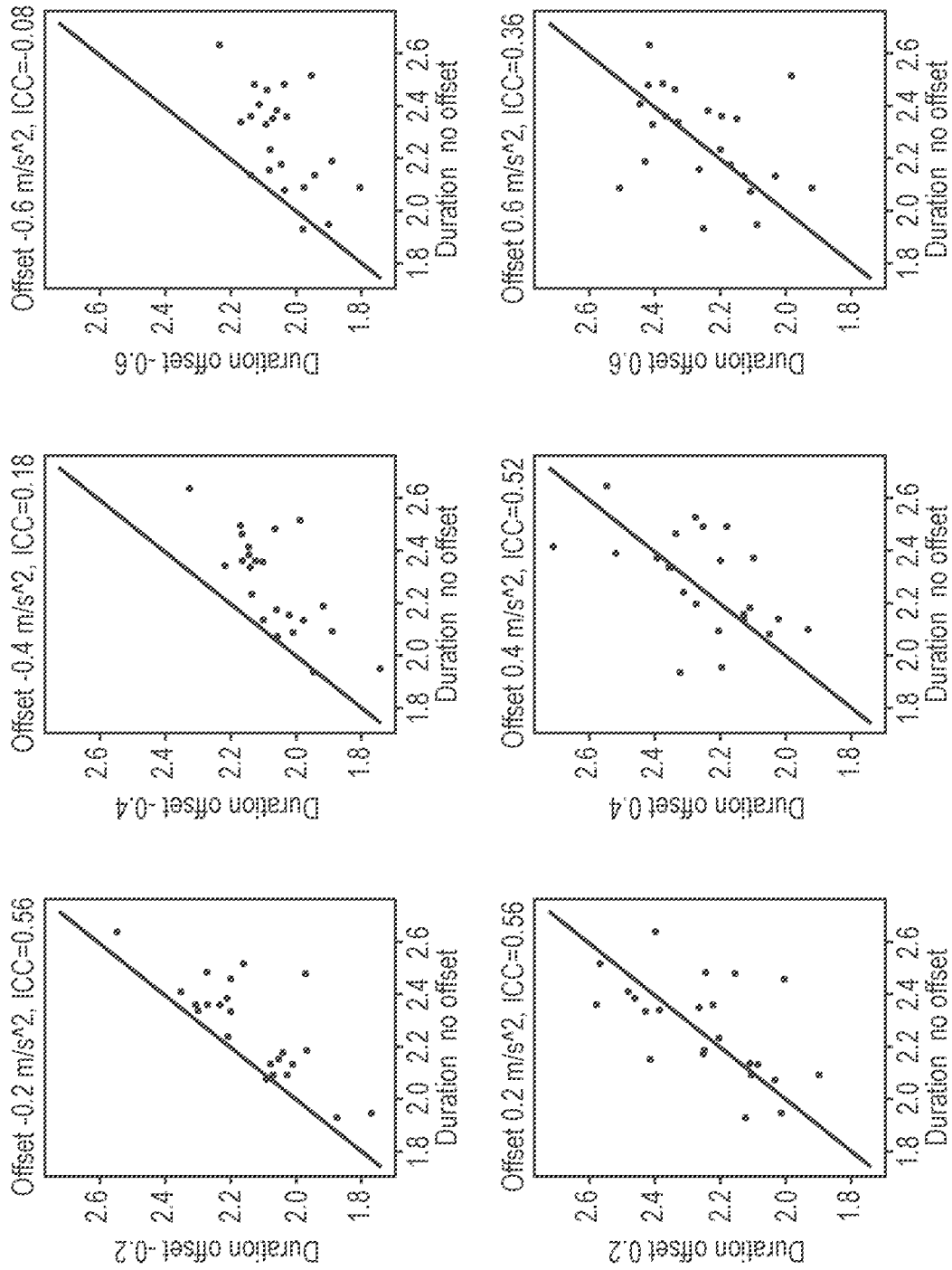
FIG. 2 is a set of graphs illustrating how a duration of an STS transfer is affected by various offsets in acceleration measurements.
Figure 2:
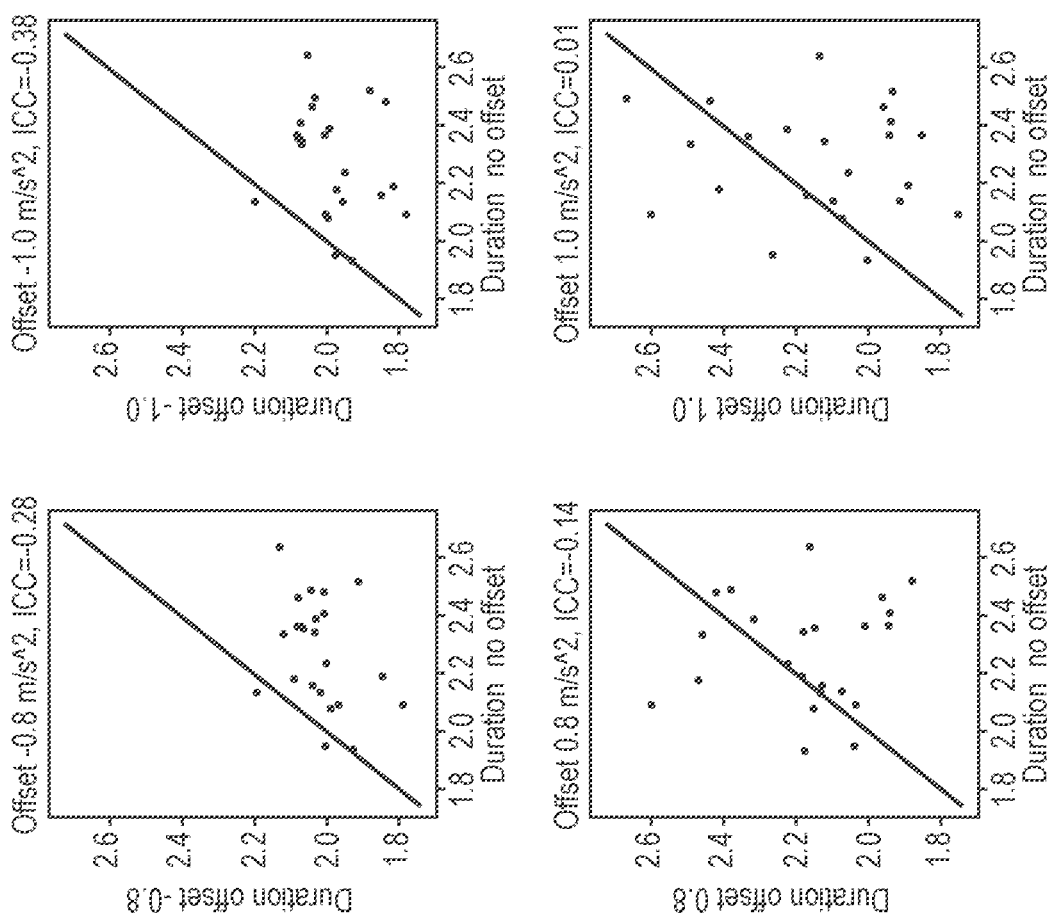
Figure 3:
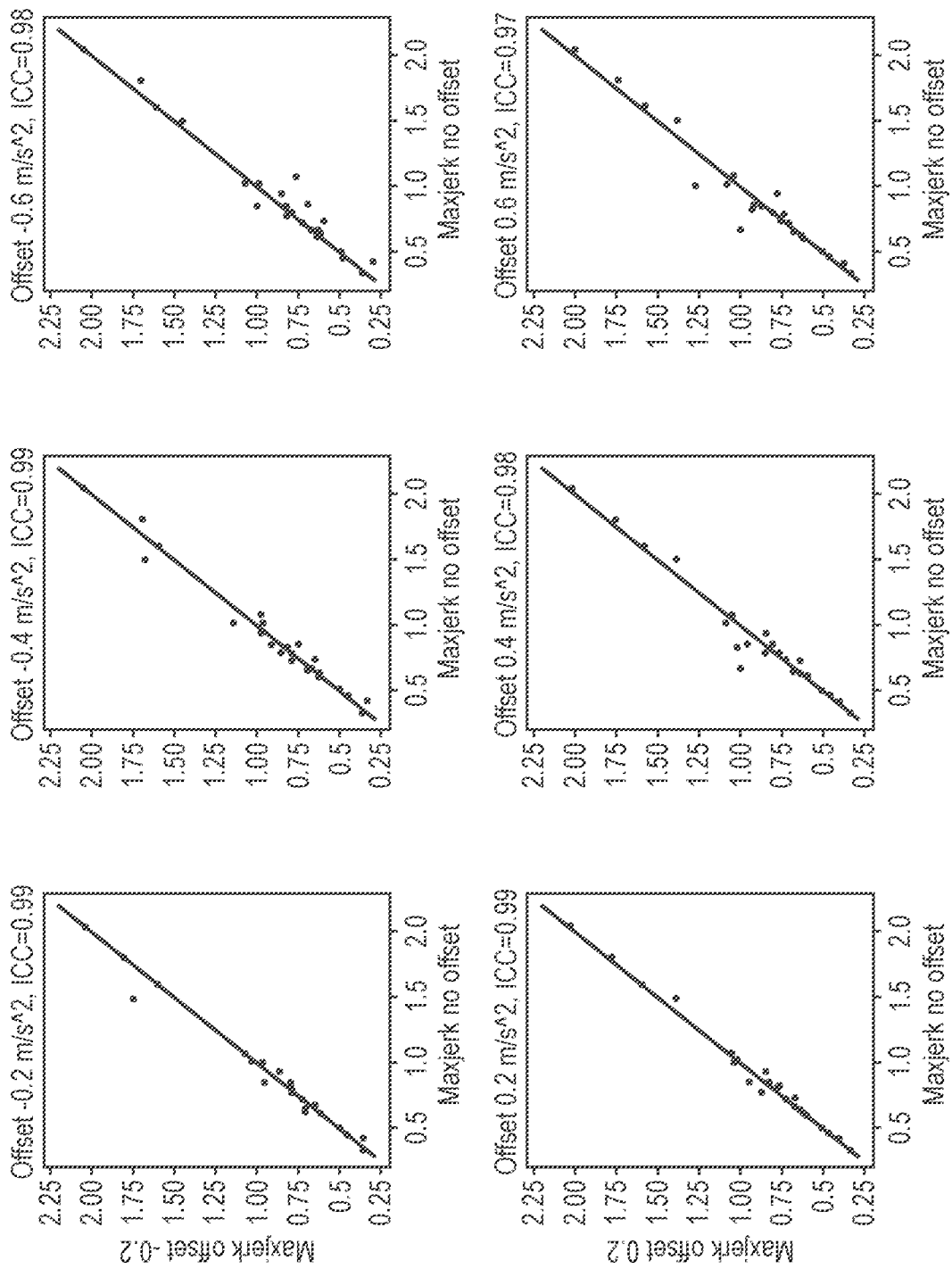
FIG. 3 is a set of graphs illustrating how maximum jerk of an STS transfer is affected by various offsets in acceleration measurements.
Figure 3:
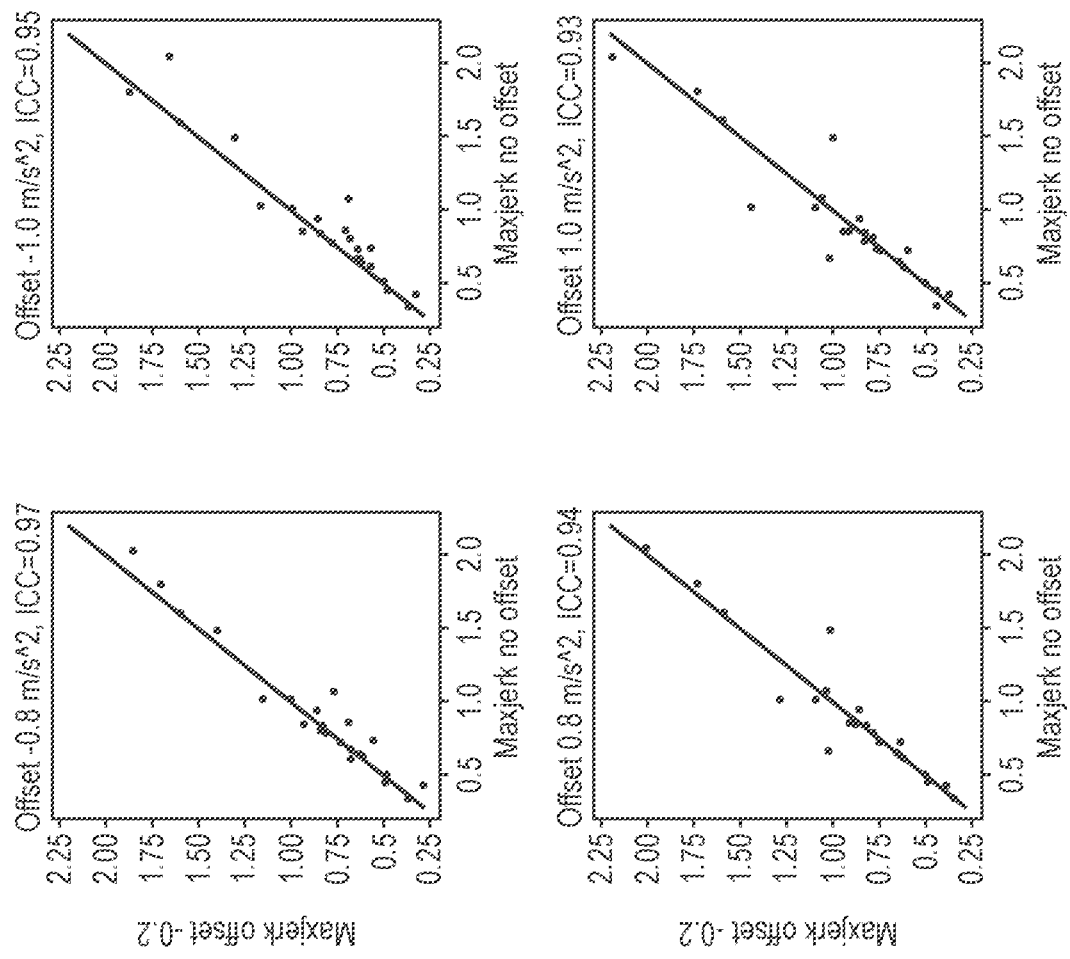
Figure 4:
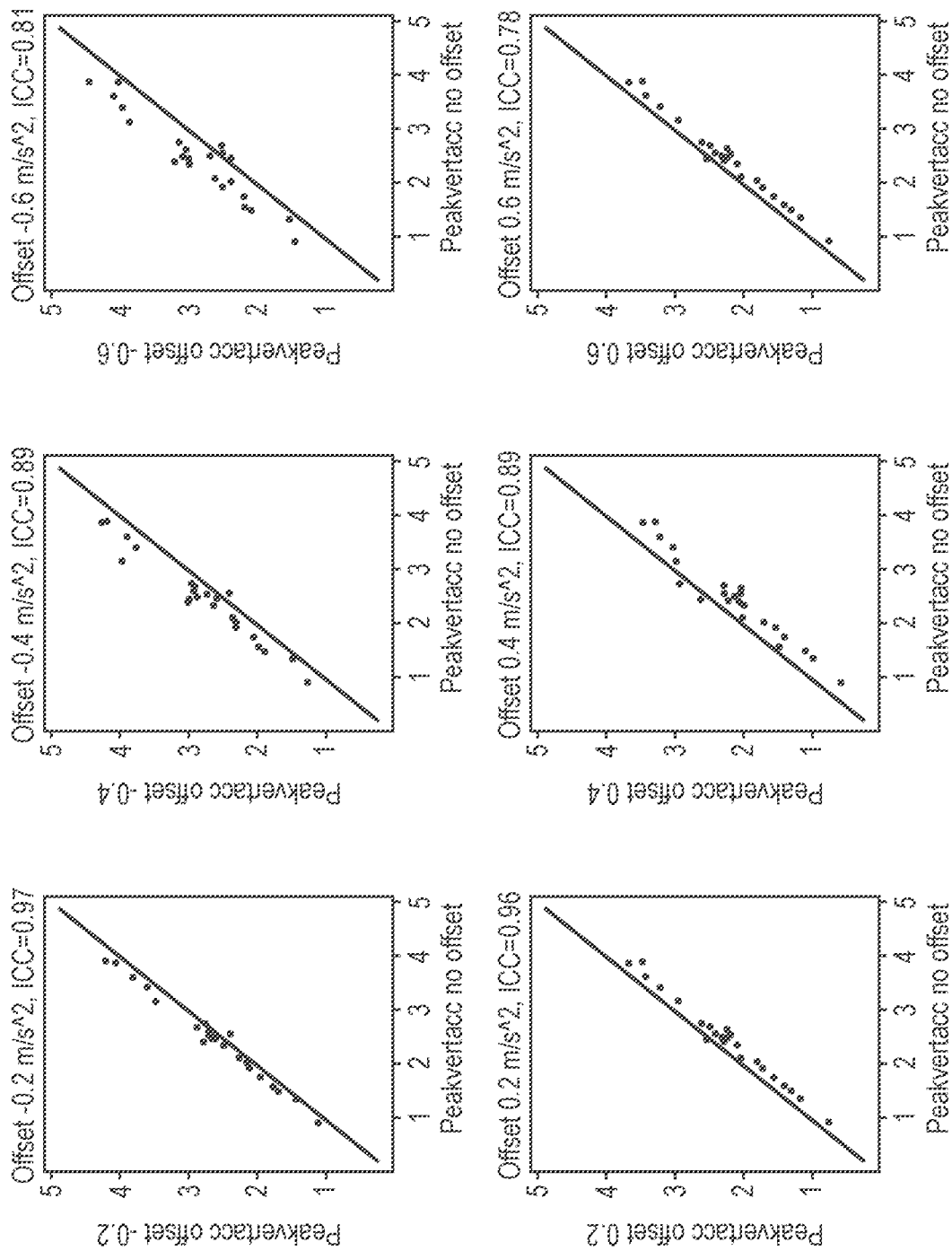
FIG. 4 is a set of graphs illustrating how peak vertical acceleration of an STS transfer is affected by various offsets in acceleration measurements.
Figure 4:
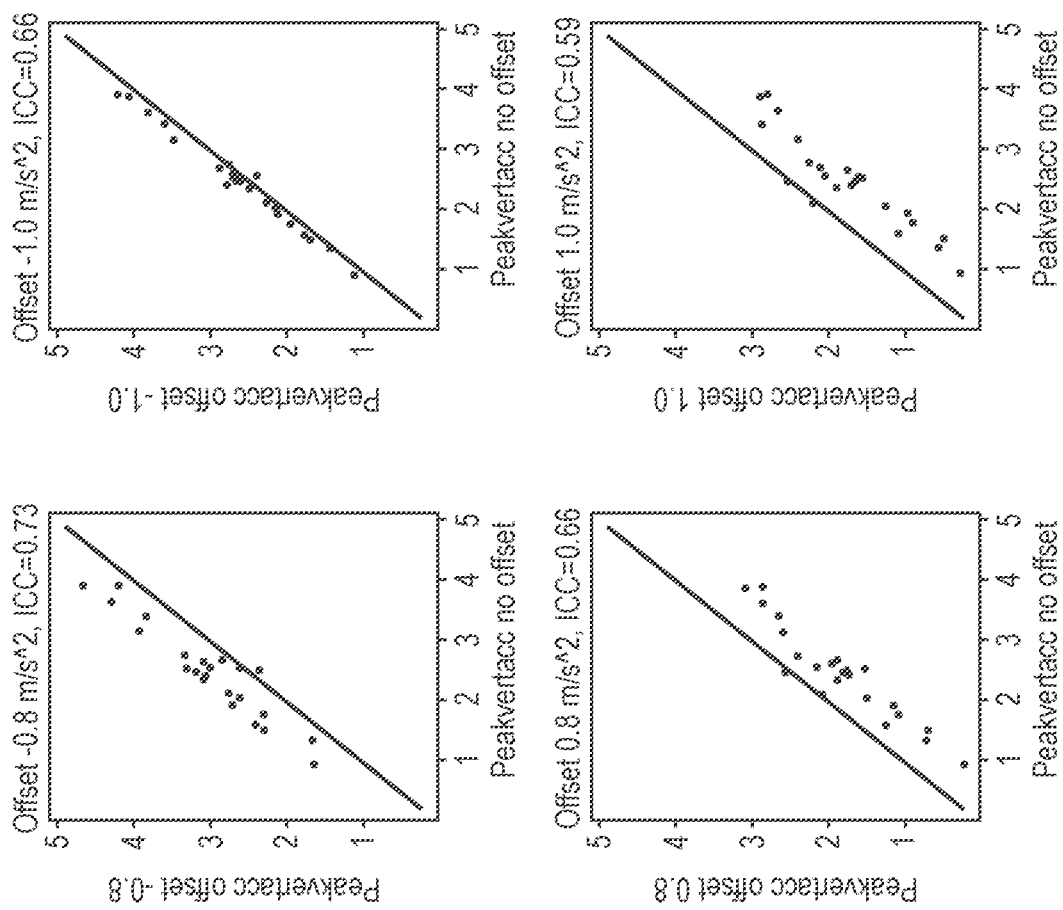
Figure 5:
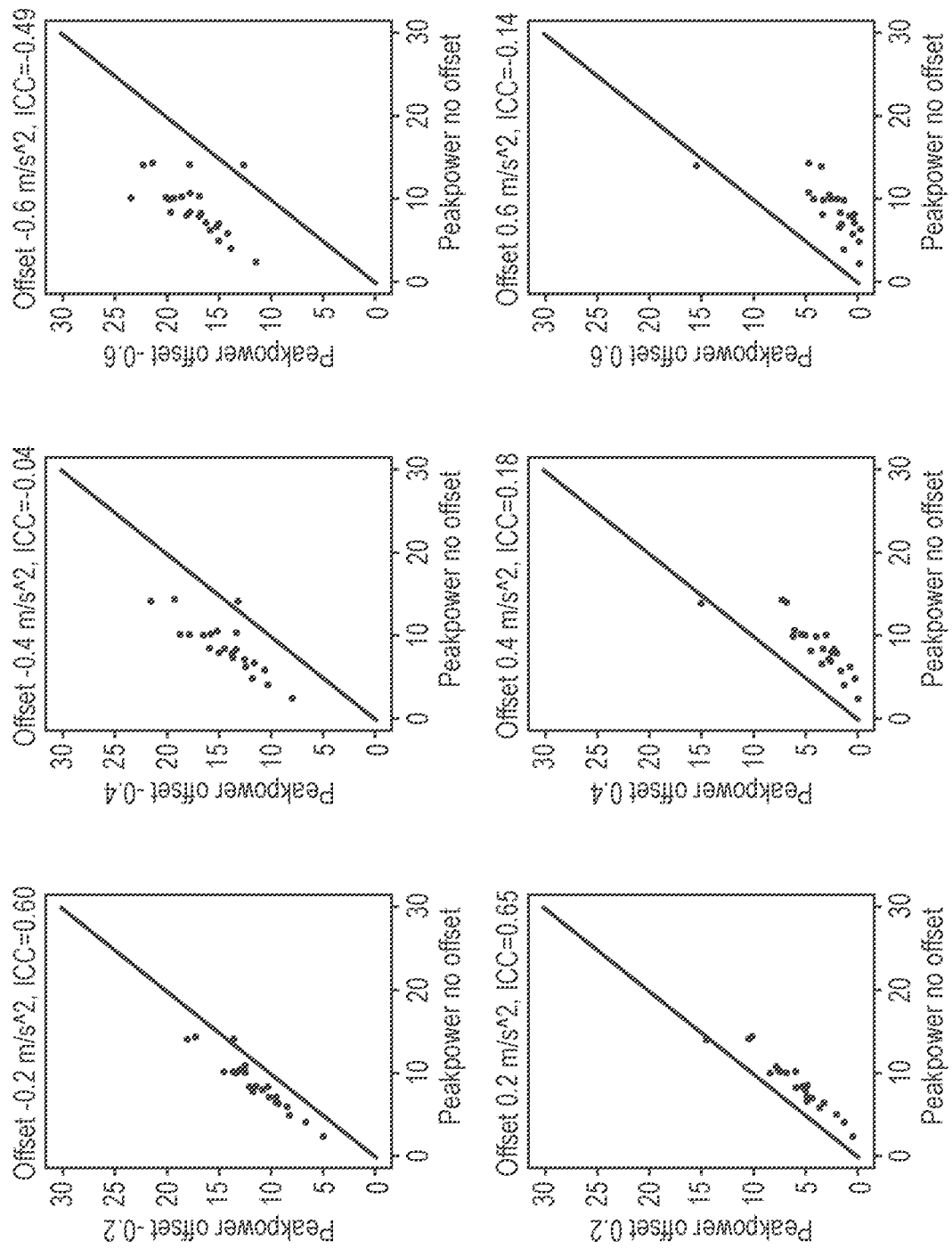
FIG. 5 is a set of graphs illustrating how peak power of an STS transfer is affected by various offsets in acceleration measurements.
Figure 5:
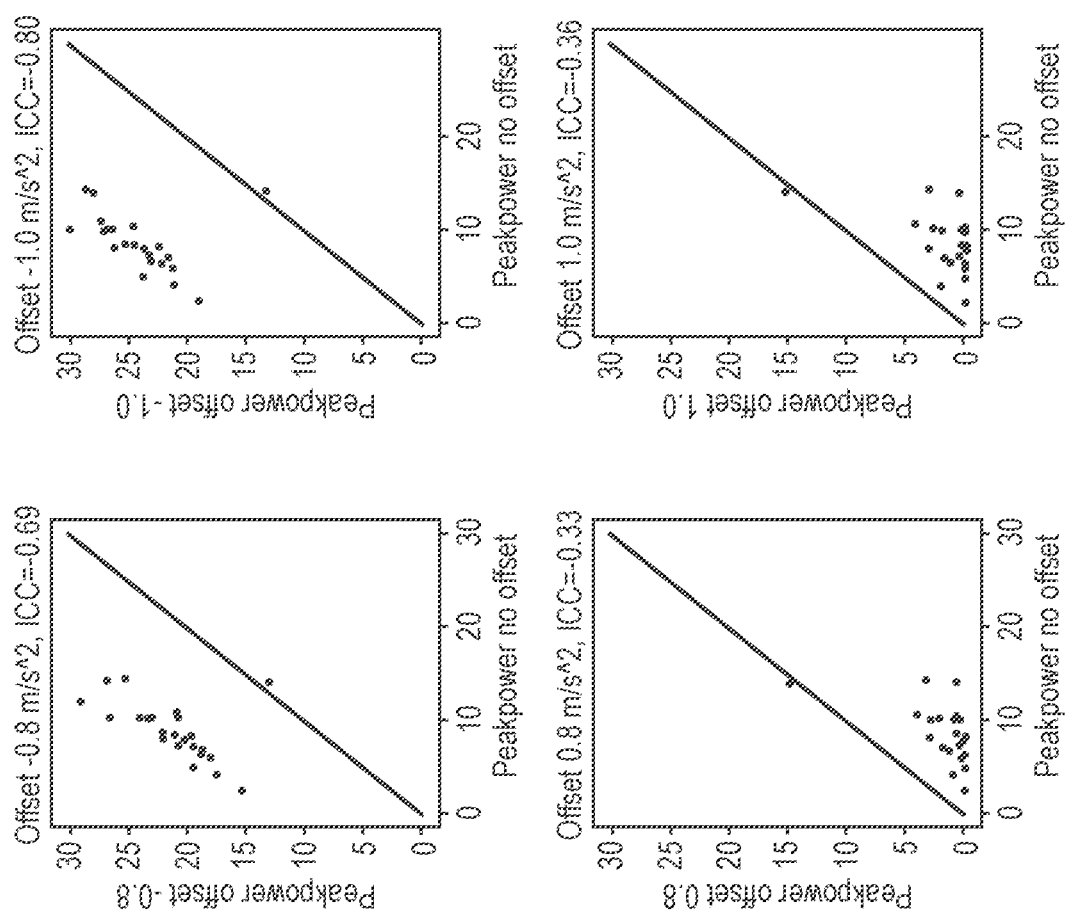

The graphs in FIGS. 2-5 illustrate how various features relating to an STS transfer that can be determined from acceleration measurements are affected by offset in the acceleration measurements. In particular, FIG. 2 is a set of graphs illustrating how a duration of an STS transfer is affected by various offsets in acceleration measurements, FIG. 3 is a set of graphs illustrating how maximum jerk of an STS transfer is affected by various offsets in acceleration measurements, FIG. 4 is a set of graphs illustrating how peak vertical acceleration of an STS transfer is affected by various offsets in acceleration measurements, and FIG. 5 is a set of graphs illustrating how peak power of an STS transfer is affected by various offsets in acceleration measurements. Each of FIGS. 2-5 include a series of graphs, with each graph representing the feature values for a particular offset ranging from $-1.0$ ms$^{-2}$ up to $1.0$ ms$^{-2}$ in $0.2$ ms$^{-2}$ increments (excluding 0 offset). Each graph is a plot of feature values averaged over a number of STS events detected per subject, with the values on the x-axis showing the reference values for feature value obtained using the originally collected measurements, and the values on the y-axis showing the feature values when simulating an offset as given in the title of that graph to the measurements along the x-axis of the accelerometer (which in these examples was the measurement axis of the accelerometer that is approximately vertical when the device 4 (in the form of a pendant or necklace) is hanging freely, and also when the subject wearing the device 4 is upright—the vertical axis has higher sensitivity to offset for the features that are derived from the accelerometer measurements). Each graph shows an associated ICC value that represents a measure of agreement between the feature values (i.e. a measure of the agreement between the feature values obtained when the offset is present and the feature values obtained in the absence of an offset, as represented by the line in each graph), with an ICC value of 1 indicating perfect agreement (i.e. the presence of the specified offset does not affect the feature value) and lower values indicating less agreement (i.e. the presence of the specified offset affects the feature value, with an ICC of 0 indicating no agreement). In some cases, an ICC value of 0.9 or above can be considered sufficient for the feature to be used when that level of offset is present.

It can be seen in FIG. 2 that the STS transfer duration has an ICC value of 0.56 with an offset of just ±0.2 ms', with the ICC decreasing further with larger offsets. Thus, the STS transfer duration is not robust against acceleration offset, and so the duration is a feature that should be omitted if an offset is present in the acceleration measurements. This is also the case for peak power in an STS transfer (FIG. 5). For the maximum jerk during an STS transfer (FIG. 3), the ICC value is only 0.95 even with an offset of ±1.0 ms$^{-2}$, so the maximum jerk is robust against offsets of at least ±1.0 ms', and so the maximum jerk is reliable even in the presence of significant offsets in the acceleration measurements. For peak vertical acceleration (FIG. 4), the ICC value is 0.89 with an offset of ±0.4 ms', so the peak vertical acceleration can be considered as robust against offsets of up to ±0.4 ms$^{-2}$. With offsets greater than ±0.4 ms$^{-2}$, the ICC value is less than 0.9, and so the peak vertical acceleration should be omitted if an offset of at least ±0.4 ms' is present in the acceleration measurements.

Thus, it can be seen in FIGS. 2-5 that some of the features relating to a STS transfer are sensitive to drift in the acceleration measurements or acceleration signal, and the reliability of an algorithm that detects the occurrence of an STS transfer or an algorithm that evaluates the performance of an STS transfer may decrease if the algorithms use the above features and drift is present.

However an approach in which the algorithm only uses features that are not sensitive to artefacts is undesirable as signal artefacts and quality issues may not be present all of the time, or even present a majority of the time, or present at all, and the features that are not used in the algorithm may have provided useful information for evaluating the movement and generally improve the reliability of the algorithm when artefacts are not present. Therefore an alternative approach is required that is able to provide reliable movement evaluation algorithm outputs both in the presence of quality issues with a signal from a sensor and when the quality of the signal is high (i.e. high quality) or sufficient.

It is known that the accuracy of some movement evaluation algorithms can be derived by considering the likelihoods of observing a value set for a certain feature set. In the case of a fall detection algorithm, the feature set can include features such as height change, impact and orientation change. These features are estimated from the sensor signals (e.g. acceleration signal) and the values of these features cover a typical range, depending on whether the measurements are of movements relating to a fall or a non-fall.

FIG. 6 includes two graphs relating to a fall detection algorithm, with the graph in FIG. 6(a) illustrating probability distributions of feature values $\bar{x}$ occurring for a fall and a non-fall, and the graph in FIG. 6(b) illustrating a receiver operating characteristics (ROC) curve. The horizontal axis of the graph in FIG. 6(a) depicts the probability of the feature values $\bar{x}$ (which is a vector, to represent values for multiple features) given the movement is a fall or not a fall (e.g. the movement is an activity of daily living (ADL), e.g. walking down stairs). The probability distribution 30 is the probability to measure the feature values $\bar{x}$ in case the event is a fall (denoted $P(\bar{x}|Fall)$), and the probability distribution 32 is the probability to measure the feature values $\bar{x}$ in case the event is not a fall (denoted $P(\bar{x}|ADL)$). These probability distributions 30, 32 are also known as the likelihoods that a given event with measured feature set $\bar{x}$ is a fall, or is not a fall/is an ADL, respectively.

The logarithm of the ratio of two probabilities constitutes the Log Likelihood Ratio (LLR), i.e.:

$$LLR(\bar{x}) = \log\left[\frac{P(\bar{x}|Fall)}{P(\bar{x}|ADL)}\right] \quad (1)$$

When the LLR is above a threshold the fall detection algorithm determines that the feature values result from a fall, and from a non-fall when the LLR is below the threshold. This is known as the Likelihood Ratio Test (LRT). In the exemplary case of the illustrated likelihood curves 30, 32, this LRT is equivalent to testing whether the vector $\bar{x}$ is 'below' or 'above' a boundary (hyper)plane, denoted in FIG. 6(a) as $\bar{\theta}_{\bar{x}}$. It will be appreciated that since $\bar{x}$ is a vector, 'above' and 'below' represent the values of $\bar{x}$ being either side of the hyperplane boundary $\bar{\theta}_{\bar{x}}$.

More generally, the LRT is given by:

$$LRT: \frac{P(\bar{x}|Fall)}{P(\bar{x}|ADL)} > \theta_\alpha = \frac{P(\bar{\theta}_{\bar{x}}|Fall)}{P(\bar{\theta}_{\bar{x}}|ADL)} \quad (2)$$

where $\theta_\alpha$ is the likelihood ratio when $\bar{x}$ is at the boundary $\bar{\theta}_{\bar{x}}$.

Given an event with feature values $\bar{x}$, the LRT decides whether the event is considered a fall or a non-fall. Effectively, the hyperplane boundary $\bar{\theta}_{\bar{x}}$ defines this outcome for the given feature values $\bar{x}$, depending on the location of $\bar{x}$ relative to $\bar{\theta}_{\bar{x}}$.

It can be seen that there is considerable overlap between the two distributions 30, 32 where feature values $\bar{x}$ could relate to a fall or non-fall. This overlapping region is indicated by bracket 34. The overlap of the distributions 30, 32 and the hyperplane boundary $\bar{\theta}_{\bar{x}}$ results in a region 38 at the right of $\bar{\theta}_{\bar{x}}$ and below curve 30 whose area represents the fraction of true positives, TP (i.e. the fraction of fall events where the feature values $\bar{x}$ are correctly identified as a fall), a region 40 at the left of $\bar{\theta}_{\bar{x}}$ and below curve 32 whose area represents the fraction of true negatives, TN (i.e. the fraction of non-fall events where the feature values $\bar{x}$ are correctly identified as a non-fall/ADL), a region 42 at the right of $\bar{\theta}_{\bar{x}}$ and below curve 32 whose area represents the fraction of false positives, FP (i.e. the fraction of non-fall events where the feature values $\bar{x}$ are incorrectly identified as a fall) and a region 44 at the left of $\bar{\theta}_{\bar{x}}$ and below curve 30 whose area represents the fraction of false negative, FN (i.e. the fraction of fall events where the feature values $\bar{x}$ are incorrectly identified as a non-fall/ADL).

Thus, the position of the decision threshold (the boundary plane $\bar{\theta}_{\bar{x}}$), determines the size of these regions 38, 40, 42 and 44 and the rate of TPs, TNs, FPs and FNs. Putting the TP and FP together while varying $\bar{\theta}_\alpha$, while varying $\bar{\theta}_{\bar{x}}$, yields the ROC curves shown in FIG. 6(b). The ROC curves plot the TPs, i.e. the fraction, or probability, of correct detections (denoted $P_D$) against the FPs, i.e. the fraction, or probability, of false alarms (denoted $P_{FA}$) for varying threshold values (i.e. varying boundary planes). At a high threshold (i.e. $\bar{\theta}_{\bar{x}}$ is at the right in FIG. 6(a) and TP and FP are at the lower left part of the ROC curve 46 and 48 in FIG. 6(b)) there are (nearly) no false alarms, but also only a few falls detected. With a lower threshold ($\bar{\theta}_{\bar{x}}$ being further to the left in FIG. 6(a)) more falls are detected, and the TP rate rises, and the FP rate rises a little (moving along the curve 46 and 48 towards the left upper corner). With an even lower threshold, more FPs occur and the ROC curve bends to the right.

Thus, a more accurate detection algorithm results the closer the ROC curve is to the left upper corner of the plot, and this is where the two likelihood curves 30, 32 have smaller overlap. This happens when the curves 30 and 32 are more distant from each other (e.g. their means are more separated) and when they are more confined (e.g. their variance is smaller).

In FIG. 6(a), the likelihood curves 30, 32 are composed by the individual contributions of each of a plurality of features. However, the features can be considered individually, and similar likelihood curves can be drawn (in which case the axis x is a scalar, assuming the feature entity is a scalar quantity).

In order to describe the effect when a sensor signal is or gets more noisy, has more artefacts and/or has a larger offset, the following model is introduced. The model does not necessarily provide an accurate quantification of the detection algorithm, but it provides an instructive way to describe its behaviour with respect to the signal noise/offset levels. The two likelihood curves 30 and 32 (now meant per separate feature) are characterized by their mean (denoted $\mu_{Fall}$ and $\mu_{ADL}$ respectively) and variance var=$\sigma^2$, where for simplicity of explanation it is assumed the variance is the same for both distributions (or their average can be used, for example).

Then, the contribution of each feature to the accuracy of the detection algorithm can be modelled by the distance $d_\mu$:

$$d_\mu = |\mu_{Fall} - \mu_{ADL}| \quad (3)$$

between the two means of its likelihood curves and the variance var=$\sigma^2$ of each feature. Likewise, the distance and variance of the overall (composed) likelihood curves can be modelled. When the detection accuracy is large (high)— curve 46 in FIG. 6(b)—the ratio $$\frac{|\mu_{Fall} - \mu_{ADL}|}{\sigma} \quad (4)$$

is also large. The curves 30 and 32 have little overlap.

In the explanation below that relates to a fall detection algorithm that can use features derived from an air pressure signal, the following subscripts are used:
- 0: to denote the overall composed likelihood distribution (curve) excluding the air pressure-related features;
- 10: to denote the (possibly composed) distribution of the air pressure-related features in ideal (noiseless/offset-less/artefact-less) conditions (i.e. so there is no (additional) noise/artefacts/offset in the air pressure signal); and
- 11: to denote the (possibly composed) distribution of the air pressure-related features in the case of noisy/offset/artefacts conditions (i.e. so there is noise/offset/artefacts in the air pressure signal).

The effect of the noise (and/or other artefacts or offset) being present in the air pressure signal is that the curves 30 and 32 in FIG. 6(a) widen, but their means do not change:

$$d\mu_{11} = d\mu_{10} \quad (5)$$

$$\sigma_{11} > \sigma_{10} \quad (6)$$

The accuracy of the fall detection algorithm without including the air pressure-related features is reflected by:

$$\frac{d\mu_0}{\sigma_0} \quad (7)$$

When including the air pressure-related features, in the ideal conditions, the accuracy improves, so:

$$\frac{d\mu_0 + d\mu_{10}}{\sqrt{\sigma_0^2 + \sigma_{10}^2}} > \frac{d\mu_0}{\sigma_0} \quad (8)$$

Similarly, when the air pressure is noisy (and/or there are other artefacts or offset), the accuracy degrades, so:

$$\frac{d\mu_0 + d\mu_{11}}{\sqrt{\sigma_0^2 + \sigma_{11}^2}} < \frac{d\mu_0}{\sigma_0} \quad (9)$$

Rewriting equation (8) leads to:

$$\sigma_{10}^2 < \sigma_0^2 * \left[\left(\frac{d\mu_{10}}{d\mu_0}\right)^2 + \frac{d\mu_{10}}{d\mu_0}\right] = \sigma_T^2 \quad (10)$$

where $\sigma_T^2$ is a threshold variance for the air pressure signal.

Similarly, rewriting equation (9), and using equation (5), leads to:

$$\sigma_{11}^2 > \sigma_0^2 * \left[\left(\frac{d\mu_{10}}{d\mu_0}\right)^2 + \frac{d\mu_{10}}{d\mu_0}\right] = \sigma_T^2 \quad (11)$$

It will be noted that equations (10) and (11) are consistent with equation (6).

A value of $\sigma_T^2$ can be found, for example by simulation, or this threshold can be set by other means.

The variance a $\sigma_{Press}^2$ in the air pressure signal can be determined, and if:

$$\sigma_{Press}^2 < \sigma_T^2 \quad (12)$$

then the fall detection algorithm can use the air pressure signal and features derived from the air pressure signal. If $$\sigma_{Press}^2 > \sigma_T^2 \quad (13)$$

then the air pressure-based features can be excluded from (not used in) the fall detection algorithm.

The threshold $\sigma_T^2$ can be found in a number of different ways. For example it can be found by observing the area under the curve (AUC) of the ROC curve, by observing the TP at a chosen FP ratio, and/or by observing the TP rate and the FP rate. In all cases, these metrics are measured when excluding the air pressure signal (in this exemplary description) and when including the air pressure signal while adding an increasing level of noise to that signal. The threshold $\sigma_T^2$ is reached when the metric equals the value from the 'excluded' measurement. In view of the above, the techniques provided herein enable an approach in which one or more features that are sensitive to quality issues in the measurements are not used to evaluate the movement of the person when signal quality issues are present. In this way, the effect of signal quality issues on the reliability of the movement evaluation algorithm can be reduced.

Briefly, according to the techniques described herein, a signal representing measurements of the subject is obtained from a first sensor 6, with this signal being referred to herein as a "first signal", the first signal is processed by the processing unit 12 to determine a quality measure for the first signal, if the quality measure meets a first criterion then values for a plurality of features in a first feature set are determined by the processing unit 12, and the movement of the subject is evaluated by the processing unit 12 based on the values for the plurality of features in the first feature set. If the quality measure does not meet the first criterion, values for one or more features in a second feature set are determined by the processing unit 12, and the movement of the subject is evaluated by the processing unit 12 based on the values for the one or more features in the second feature set. The first feature set comprises one or more features that are to be determined from the first signal (these features are referred to as "first features"). The one or more features in the second feature set are a subset of the plurality of features in the first feature set, and the second feature set does not include at least one of the first features that are in the first feature set. Thus, when the quality of the first signal is not sufficient, one or more first features (that are determined from the first signal) are dropped from consideration when evaluating the movement of the subject. The one or more first features that are dropped are features that are sensitive to the quality of the first signal, i.e. features whose values are affected or significantly affected by the quality of the first signal.

In some embodiments, the first feature set can also include one or more features that are to be determined from a signal from a second sensor 8 (this signal is referred to herein as a "second signal", and the one or more features that are to be determined from the second signal are referred to herein as "second features"). In these embodiments, the second feature set can include just some of the first features that are in the first feature set, or alternatively the second feature set may not include any of the first features that are in the first feature set. In this latter case, the first signal (and thus the first sensor 6) is effectively excluded from the evaluation of the movement of the subject due to the quality of the first sensor 6 (as determined from the first signal) being insufficient for use in evaluating the movement of the subject.

In a first specific example, in which the performance of a sit-to-stand (STS) transfer by the subject is evaluated, the first sensor 6 can be an accelerometer, and the quality measure can be an amount (magnitude) of offset present in the acceleration measurements. If the magnitude of the offset is below a threshold value, then the performance of the STS transfer can be evaluated based on values of a first feature set comprising the first features: duration of the subject rising from a chair, peak acceleration of the subject rising from a chair, peak power of the subject rising from a chair, and maximum jerk of the subject rising from a chair. However, if the magnitude of the offset is above the threshold value, then the values of the first features duration, peak acceleration and peak power will be inaccurate or unreliable as a result of the offset. In that case the performance of the STS transfer is evaluated based on a second feature set comprising a subset of the first features in the first feature set, namely: the maximum jerk of the subject rising from a chair. Thus, the following first features are deemed to be unreliable when the magnitude of the offset is above the threshold value: duration of the subject rising from a chair, peak acceleration of the subject rising from a chair and peak power of the subject rising from a chair.

In a second specific example, in which the measurements are evaluated to determine if the subject has suffered a fall, the first sensor 6 can be an air pressure sensor, and the quality measure can be an amount of noise present in the air pressure measurements. The noise can be intrinsic to the used sensor, i.e. as present in the device as chosen by the subject to be worn. The noise level can also vary dynamically, for example during stormy weather conditions more fluctuations will appear in the air pressure measurements. A second sensor 8 in the form of an accelerometer is also used to obtain acceleration measurements. If the amount of noise is below a threshold value, then the fall detection can be performed based on values of a first feature set comprising the first feature: change in altitude, and the values of second features that are determined from the second signal (the acceleration signal): occurrence of an impact, change in orientation, and a period in which the subject is motionless. However, if the amount of noise in the air pressure signal is above the threshold value, then the value of the change in altitude determined from the air pressure signal will be inaccurate or unreliable as a result of the noise. In that case fall detection is performed based on a second feature set that includes features that are a subset of the features in the first feature set, and specifically the second feature set just comprises the second features that are in the first feature set, namely: occurrence of an impact, change in orientation, and a period in which the subject is motionless. Thus, in this case, while there is too much noise in the air pressure signal, the air pressure signal is not used in fall detection.

In a third specific example, which is an extension of the second specific example above, as it is noted that a change in altitude is a useful indicator of whether a subject has fallen, and that it is also possible to determine a change in altitude from acceleration measurements. Thus, when there is too much noise in the air pressure signal (i.e. the noise is above the threshold value and the air pressure signal is not used to determine a change in altitude), the processing unit 12 can additionally process the acceleration signal to determine a change in altitude of the subject, and use this change in altitude in determining if the subject has fallen. The extraction of this feature does not occur when the quality of the air pressure signal is sufficient (i.e. a change in altitude from acceleration measurements is not a first feature that is in the first feature set), and is considered to be a feature whose value is determined from the acceleration signal in addition to the second features that are in the first feature set and in the second feature set.

General embodiments of the techniques presented herein for evaluating the movement of a subject are described below with reference to the flow chart in FIG. 7. As noted above, the evaluation of movement can include any of evaluating the walking ability of the subject, evaluating whether the subject has suffered a fall, evaluating a sit-to-stand movement, and determining the physical activity of the subject (i.e. determine what activity the subject is doing, such as sitting down, standing up, walking, running, ascending stairs, descending stairs, falling, lying down, exercising, etc.). Those skilled in the art will be aware of other types of evaluation of movement that the techniques described herein can be applied to.

Figure 7:
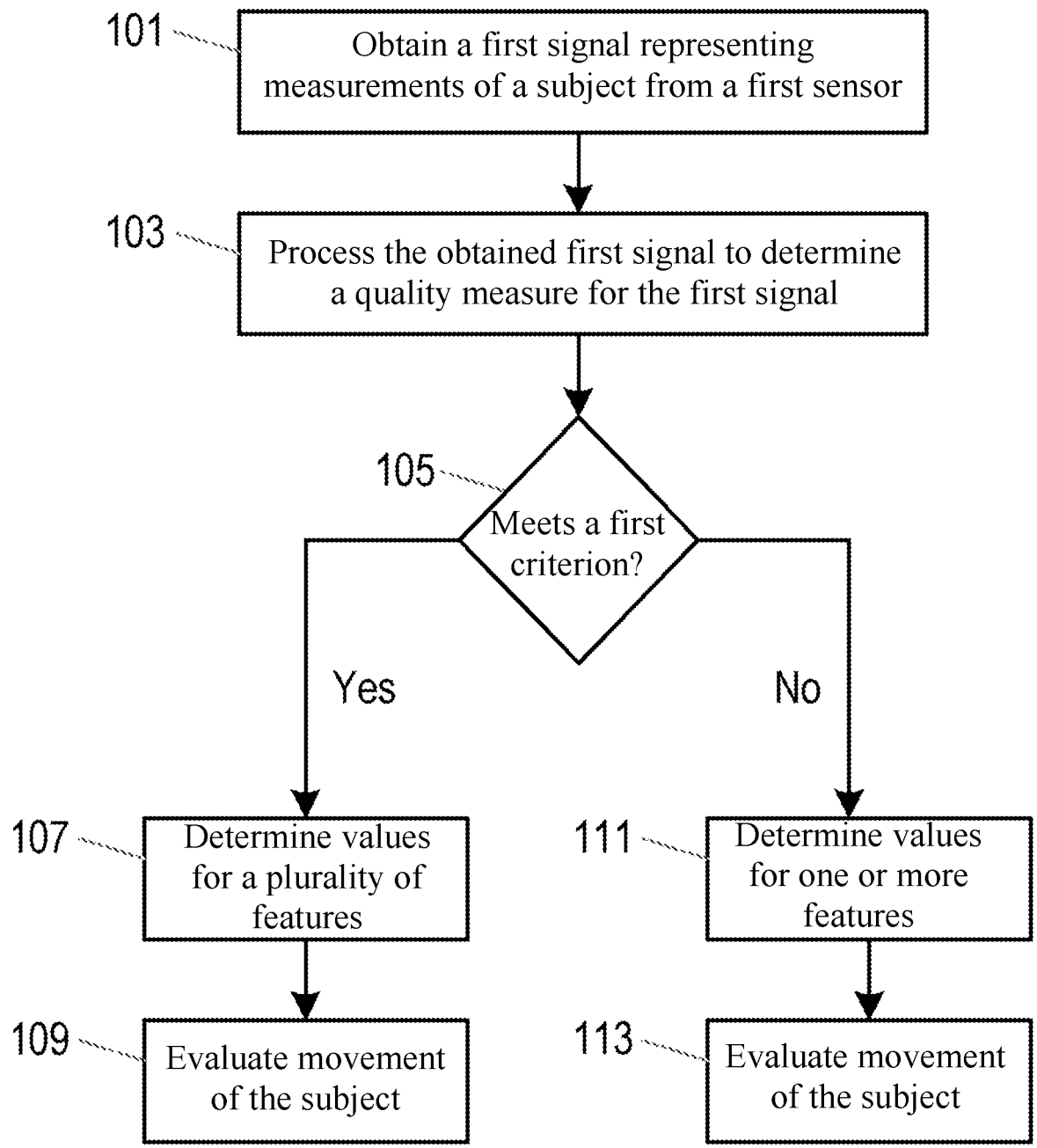
FIG. 7 is a flow chart illustrating a method according to an exemplary embodiment.

One or more of the steps of the method of FIG. 7 can be performed by the processing unit 12 in the apparatus 10, in conjunction with any of the first sensor 6, second sensor 8, memory unit 14, interface circuitry 16 and user interface 18 as appropriate. The processing unit 12 may perform the one or more steps in response to executing computer program code, that can be stored on a computer readable medium, such as, for example, the memory unit 14.

In a first step, step 101, the processing unit 12 obtains a first signal representing measurements of the subject from a first sensor 6. The first sensor 6 is in device 4, and the device 4 is carried or worn by the subject as the first sensor 6 measures the subject. The measurements of the subject relate to the subject during at least a first time period. In this step, the processing unit 12 can obtain the first signal directly from the first sensor 6 or indirectly from the first sensor 6 (e.g. via interface circuitry 16 and interface circuitry 20). In these embodiments the processing unit 12 may be able to process the measurements as they are received (e.g. in real-time or near-real-time) to evaluate the movement of the subject in real time (e.g. to determine if the subject has fallen). Alternatively, the first signal may have been obtained previously and stored in the memory unit 14, in which case in step 101 the processing unit 12 can retrieve the first signal from the memory unit 14. In some embodiments the processing unit 12 can receive the first signal representing measurements of the subject during the first time period or after the first time period has passed. Alternatively, the processing unit 12 can receive the first signal over the course of the first time period as the subject is measured. The first time period may have any suitable duration, for example the first time period can be at least 5 seconds (s), at least 10 s, at least 20 s, or at least 1 minute.

In some embodiments, the first sensor 6 can be a movement sensor, i.e. a sensor that measures movements of the subject over time, and the first signal obtained in step 101 is a "first movement signal". Thus, the first sensor 6 can be any of an accelerometer, an air pressure sensor, a magnetometer, a gyroscope, a satellite positioning system (SPS) receiver (e.g. a GPS receiver, a GLONASS receiver, a Galileo positioning system receiver, etc.), and a pressure sensor that can be positioned in the subject's shoe (or in each shoe) or other footwear to measure the pressure that the foot is applying to the ground (since these measurements can be indicative of footsteps). Alternatively, the first sensor 6 can be a skin conductivity sensor, a PPG sensor, or any other type of physiological characteristic sensor.

In step 103, the obtained first signal is processed to determine a quality measure for the first signal. The quality measure can be any type of measure of the quality of the first signal. For example the quality measure can be a measure of an offset in the measurements, a noise level in the measurements, a signal-to-noise ratio (SNR) for the first signal, signal variance, autocorrelation, median absolute deviation (MAD) or entropy.

In embodiments where the first sensor 6 is an accelerometer, the quality measure can be a measure of an offset in the acceleration signal. The offset can be determined as follows. In some embodiments, periods are identified from the acceleration signal where the variance of the three-dimensional (3D) signal is below a certain threshold (these are referred to as quiet or quasistatic periods). During these periods the norm is expected to be equal to the gravitational acceleration, approximately 9.81 $ms^{-2}$. The deviation of the norm of the signal in these periods from 9.81 $ms^{-2}$ is considered the offset. The offset would typically be available during multiple quasistatic periods, which may have different offsets due to changing orientations with respect to gravity. In that case the largest deviation may be used as the offset. Alternatively, it can be further estimated that the offset distributes over the three axes of the accelerometer according to the ratio at which gravity appears in them.

In embodiments where the first sensor 6 is an air pressure sensor, the quality measure can be a measure of the noise in the air pressure measurements. In some embodiments, the measure of the noise can be a measure of the variance in the air pressure measurements or the variance of changes of air pressure over time. The variance of the air pressure measurements can be determined using a time window (e.g. with a duration of around 1 or 2 seconds) placed over the air pressure measurement signal and the variance in the air pressure measurements in the time window is computed. The time window might be a running window (i.e. it is moved over the air pressure signal), or it can be applied to the air pressure measurements at regular intervals. The variance of changes of air pressure over time can be determined by determining an air pressure difference signal as the difference between the measured air pressure at a current sample (time) and the measured air pressure at a sample (time) a few seconds ago (e.g. 2, 5 or 12 seconds), and determining the variance of the difference signal.

In step 105, it is determined if the quality measure meets a first criterion. The first criterion can be a threshold value, or an acceptable range of values for the quality measure.

In embodiments where the first sensor 6 is an accelerometer and the quality measure is an offset, in step 105 it can be determined that the offset meets the first criterion if the offset is below an offset threshold, and determined that the offset does not meet the first criterion if the offset exceeds the offset threshold.

In embodiments where the first sensor 6 is an air pressure sensor and the quality measure is a noise level or a variance, in step 105 it can be determined that the noise level or variance meets the first criterion if the noise level or variance is below a threshold, and determined that the noise level or variance does not meet the first criterion if the noise level or variance exceeds the threshold.

If the determined quality measure meets the first criterion, then the method passes to step 107, and the processing unit 12 determines values for a plurality of features in a first feature set. The first feature set comprises one or more first features that are to be determined from the first signal. The features in the first feature set are those features that are useful for evaluating the movement of the subject (e.g. features that are useful for detecting a fall, for evaluating the performance of a STS transfer, for determining the physical activity that the subject is performing, etc.). At least one of the features in the first feature set is a feature that can be determined from the first signal (i.e. at least one of the features in the first feature set is a first feature). In some embodiments, all of the features in the first feature set are first features (i.e. all of the features in the first feature set can be determined from the first signal). In alternative embodiments, as described in more detail below, the first feature set can include at least one feature that is to be determined from a second signal from a second sensor 8.

In some embodiments, for example embodiments where the first sensor 6 is an accelerometer, the first features can include any one or more of: presence of an impact, change in altitude, velocity, vertical velocity, orientation of the subject and/or a part of the body of the subject, change in orientation of the subject and/or a part of the body of the subject, duration of the subject rising from a chair, peak acceleration of the subject rising from a chair, peak power of the subject rising from a chair, maximum jerk of the subject rising from a chair, and variance, period, periodicity, sample entropy and/or cadence of walking by the subject. In some embodiments, for example embodiments where the first sensor 6 is an air pressure sensor, the first feature can include any one or more of: altitude, change in altitude of the subject, vertical velocity, and vertical acceleration.

Next, in step 109, the movement of the subject is evaluated based on the values for the plurality of features determined in step 107. Those skilled in the art will be aware of many different types of algorithms that are able to evaluate a subject's movement based on features extracted from a sensor signal, such as an acceleration signal and/or an air pressure signal, and therefore substantial details are not provided herein. However, in some cases an algorithm can combine the values for the features determined in step 107, for example into a single value or score, and this 'aggregate' value or score can be used as the evaluation of the movement (e.g. if the value or score is an activity level score), or it can be compared to a threshold to evaluate the movement (e.g. comparing the score to a fall detection threshold). In some cases the combination of the feature values into an aggregate score or value can occur after analysing the first signal to determine a type of physical activity that the subject is performing (e.g. walking, running, STS transfer, etc.), with the feature values being combined according to the type of physical activity that the subject is performing. In some cases the aggregate score can be based on values for features determined in step 107 that relate to multiple events, e.g. a 90th percentile of the periodicities of all walking events during a week, or the peak powers of all sit to stand (STS) transfers during a single day.

If in step 105 it is determined that the quality measure determined in step 103 does not meet the first criterion, then the method passes to step 111 in which values for one or more features in a second feature set are determined. The second feature set comprises one or more features. The one or more features in the second feature set are a subset of the plurality of features in the first feature set (i.e. all of the features in the second feature set are also in the first feature set), although the second feature set does not include at least one of the one or more first features that are in the first feature set and that are to be determined from the first signal. The first feature(s) not included in the second feature set are preferably the or those first feature(s) that are sensitive to the quality of the first signal (as represented by the quality measure). In other words, a first feature whose value can be affected by the quality issue (e.g. affected by an offset in the measurements or the presence of noise in the measurements), which leads to the determined value of that first feature being unreliable, is not included in the second feature set.

In some embodiments, for example where the first sensor 6 is an accelerometer, and the quality measure is an offset in the acceleration measurements, the second feature set may not include one or more of: presence of an impact, change in altitude, velocity, vertical velocity, orientation of the subject and/or a part of the body of the subject, duration of the subject rising from a chair, peak acceleration of the subject rising from a chair, and peak power of the subject rising from a chair. In embodiments where the first sensor 6 is an air pressure sensor, the second feature set may not include (at least) altitude. This is because vertical velocity is the first derivative of altitude, and vertical acceleration is the second derivative of altitude, and differentiation effectively acts as a high pass filter (with the noise in the air pressure measurements (the variance) being white noise (i.e. a flat spectrum)).

In embodiments where all of the features in the first feature set are first features, at least one (but not all) of the first features in the first feature set are also in the second feature set. In embodiments where the first feature set includes at least one feature that is to be determined from a second signal from a second sensor 8, the second feature set may not include any of the first features in the first feature set. In this case, the measurements from the first sensor 6 are effectively disregarded when evaluating the movement of the subject. Alternatively, in embodiments where the first feature set includes at least one feature that is to be determined from a second signal from a second sensor 8, the second feature set may include at least one (but not all) of the first features that are in the first feature set.

Next, in step 113, the movement of the subject is evaluated based on the values for the plurality of features determined in step 111. Step 113 can be performed in a similar way to step 109.

In some embodiments, the method can further comprise a step of outputting the result of step 109 or 113 (whichever is performed), or outputting an indication of the result, for example to a user, the subject, or another electronic device or apparatus, such as a computer, laptop, server, etc. Such an output may indicate, for example, that the subject has fallen or not fallen (as appropriate), a measure of the performance of a STS transfer, or an indication of the physical activity/ies that the subject has been doing.

In some embodiments, which can be in addition or alternative to the above embodiments, the method can further comprise outputting an indication of which 'branch' of the method in FIG. 7 was used to evaluate the movement of the subject. For example, this indication can indicate any of whether the quality measure of the first signal met the first criterion, whether the movement was evaluated using a full set of features (step 109) or a reduced set of features (step 111), which feature or features were used to evaluate the movement, and which feature or features were not used to evaluate the movement. In some embodiments, if the quality measure of the first signal did not meet the first criterion, the indication may indicate whether this was due to a sensor quality issue or a calibration issue. In the latter case, the user or subject could be instructed or advised to perform a calibration procedure to improve the quality of the measurements by the first sensor 6.

In some embodiments, the method steps shown in FIG. 7 can be repeated over time for new measurements of the subject (i.e. a new instance of the first signal, or new measurement samples for the first signal). It will be appreciated that the result of step 105 may vary over time (i.e. as the method in FIG. 7 is repeated for new measurements), for example if a source of noise in the measurements starts or stops. For example in the case of the first sensor 6 being an air pressure sensor, there may be a period of time where a window is opened, leading to the quality of the air pressure measurements being insufficient for use in a fall detection algorithm, and a fall may be detected according to the branch including steps 111 and 113. However, once the window is closed (or before the window was opened), the quality of the air pressure measurements may be sufficient for use in a fall detection algorithm, and a fall may be detected according to the branch including steps 107 and 109.

In any of the above embodiments, the features that are in the first feature set and in the second feature set can be predetermined, i.e. the first feature(s) that are not present in the second feature set if the quality measure does not meet the first criterion are predetermined (in other words the first feature(s) to drop are not determined dynamically). The first feature(s) that are excluded from the second feature set are determined based on the effect that the quality of the first signal has on the reliability of the value determined for the first feature from the first signal.

In some embodiments, it is possible to determine multiple different quality measures for the first signal in step 103, and evaluate whether each of those quality measures meets a respective criterion. Multiple different second feature sets can be defined, with each second feature set being used when a particular criterion is not met. The second feature sets can differ in the first feature(s) that are not in the second feature set (but that are in the first feature set). For example, a first quality measure can be an amount of offset in an acceleration signal, with peak acceleration and peak power being excluded from the relevant second feature set. A second quality measure can be a measure of white noise in the acceleration signal, with the jerk being excluded from the relevant second feature set if the white noise level is above a noise threshold, as jerk is sensitive to white noise.

In some embodiments, rather than the first criterion simply being 'met' or 'not met' (e.g. based on a comparison to a single threshold), the first criterion may have different levels of 'not being met' (e.g. based on a comparison of the quality measure to multiple thresholds). In this case, multiple different second feature sets can be defined that are to be used depending on the extent to which the first criterion is not met. The second feature sets will differ in the first feature(s) that are not in the second feature set, with the number of first features excluded from the second feature set increasing the greater the extent that the first criterion is not met. For example, the quality measure can be an amount of offset in an acceleration signal, and two thresholds can be defined (an upper threshold and a lower threshold). If the offset is above the lower threshold but below the upper threshold, then a second feature set can be used in which peak power is excluded (since peak power is more sensitive to offset than peak acceleration). However, if the offset is above the upper threshold (and therefore also above the lower threshold), then a second feature set can be used in which peak power and peak acceleration are excluded.

As noted above, in some embodiments the first feature set can also include one or more features that are to be determined from a second signal from a second sensor 8 (these features are "second features"), and the second feature set also includes the one or more second features that are to be determined from the second signal. The second sensor 8 is a different type of sensor to the first sensor 6. The second sensor 8 can be any of an accelerometer, an air pressure sensor, a magnetometer, a gyroscope, a (SPS) receiver, and a pressure sensor. Alternatively, the second sensor 8 can be a skin conductivity sensor, a PPG sensor, or any other type of physiological characteristic sensor. In these embodiments, the method further comprises obtaining the second signal from the second sensor 8, and steps 107 and 111 further comprise the processing unit 12 determining values for the one or more second features from the second signal.

In some embodiments, a quality measure can also be determined from the second signal, with this quality measure being evaluated against a second criterion. If the second criterion is not met, a second feature set can be used in step 111 and 113 that excludes one or more second feature(s) that are present in the first feature set.

Therefore there is provided techniques that enable reliable evaluation of the movement of a subject irrespective of artefacts or quality issues present in a measurement signal from a sensor that measures the subject.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for evaluating movement of a subject, the method comprising:
   obtaining a first signal representing measurements of the subject from a first sensor;
   processing the first signal to determine a quality measure for the first signal;
   determining if the determined quality measure meets a first criterion;
   if the determined quality measure meets the first criterion, determining values for a plurality of features in a first feature set, the first feature set comprising one or more first features to be determined from the first signal, and evaluating the movement of the subject based on the values for the plurality of features in the first feature set; and
   if the determined quality measure does not meet the first criterion, determining values for one or more features in a second feature set, wherein the one or more features in the second feature set are a subset of the plurality of features in the first feature set and the second feature set does not include at least one of the one or more first features in the first feature set, and evaluating the movement of the subject based on the values for the one or more features in the second feature set.

2. A method as defined in claim 1, wherein the first feature set comprises a plurality of first features to be determined from the first signal.

3. A method as claimed in claim 2, wherein the plurality of features in the first feature set are each first features to be determined from the first signal.

4. A method as defined in claim 1, wherein the first feature set further comprises one or more second features to be determined from a second signal representing measurements of the subject from a second sensor, and the second feature set further comprises the one or more second features, and wherein the method further comprises:
   obtaining the second signal from the second sensor; and
   wherein the steps of determining values for one or more features in the first feature set and determining values for one or more features in the second feature set comprise determining values for the one or more second features from the second signal.

5. A method as defined in claim 4, wherein the second feature set does not include any of the one or more first features.

6. A method as defined in claim 1, wherein the first sensor is an accelerometer and the first signal is an acceleration signal representing acceleration measurements.

7. A method as defined in claim 6, wherein the quality measure is a measure of an offset in the acceleration signal.

8. A method as defined in claim 1, wherein the first sensor is an air pressure sensor and the first signal is an air pressure signal representing air pressure measurements.

9. A method as defined in claim 8, wherein the quality measure is a measure of variance in the air pressure signal or a measure of variance in differences in the air pressure signal.

10. A computer program product comprising a non-transitory computer readable medium having computer readable code embodied therein, the computer readable code being configured such that, on execution by a suitable computer or processor, the computer or processor is caused to perform the method of claim 1.

11. An apparatus for evaluating movement of a subject, the apparatus comprising a processing unit that is configured to:
    obtain a first signal representing measurements of the subject;
    process the first signal to determine a quality measure for the first signal;
    determine if the determined quality measure meets a first criterion;
    determine values for a plurality of features in a first feature set if the determined quality measure meets the first criterion, the first feature set comprising one or more first features to be determined from the first signal, and evaluate the movement of the subject based on the values for the plurality of features in the first feature set; and
    determine values for one or more features in a second feature set if the determined quality measure does not meet the first criterion, wherein the one or more features in the second feature set are a subset of the plurality of features in the first feature set and the second feature set does not include at least one of the one or more first features in the first feature set, and evaluate the movement of the subject based on the values for the one or more features in the second feature set.

12. An apparatus as defined in claim 11, wherein the first feature set comprises a plurality of first features to be determined from the first signal, and each of the plurality of features in the first feature set are first features.

13. An apparatus as defined in claim 11, wherein the first feature set further comprises one or more second features to be determined from a second signal representing measurements of the subject from a second sensor, and the second feature set further comprises the one or more second features, and wherein the processing unit is further configured to:
    obtain the second signal from the second sensor; and
    wherein the processing unit is configured to determine values for one or more features in the first feature set and determine values for one or more features in the second feature set by determining values for the one or more second features from the second signal.

14. An apparatus as defined in claim 13, wherein the second feature set does not include any of the one or more first features.

15. A system for evaluating movement of a subject, the system comprising:
    a device that is to be worn or carried by a subject and that comprises a first sensor for measuring the subject to generate the first signal; and
    an apparatus as claimed in claim 11.

* * * * *